US011228981B2

(12) United States Patent
Sarve et al.

(10) Patent No.: US 11,228,981 B2
(45) Date of Patent: Jan. 18, 2022

(54) METHOD FOR TRANSITIONING A DEVICE CONTROLLER COMPRISED IN AN ELECTRONIC DEVICE, AND AN ELECTRONIC DEVICE (71) Applicant: Fingerprint Cards AB, Gothenburg (SE)

(72) Inventors: Hamid Sarve, Gothenburg (SE); Jimmy Björklund, Gothenburg (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 16/766,962

(22) PCT Filed: Dec. 3, 2018

(86) PCT No.: PCT/SE2018/051240
§ 371 (c)(1),
(2) Date: May 26, 2020

(87) PCT Pub. No.: WO2019/112507
PCT Pub. Date: Jun. 13, 2019

(65) Prior Publication Data
US 2021/0250867 A1  Aug. 12, 2021

(30) Foreign Application Priority Data

Dec. 6, 2017  (SE) .................................. 1751499-3

(51) Int. Cl.
*H04W 52/02*  (2009.01)
*G06K 9/00*  (2006.01)
(Continued)

(52) U.S. Cl.
CPC ...... *H04W 52/0254* (2013.01); *G06K 9/0002* (2013.01); *G06K 9/0004* (2013.01); *G06K 9/00087* (2013.01); *G06K 9/00926* (2013.01)

(58) Field of Classification Search
None
See application file for complete search history.

(56) References Cited

U.S. PATENT DOCUMENTS 9,589,171 B1 * 3/2017 Larsson ............... G06K 9/0002
2005/0226468 A1 * 10/2005 Deshpande ............ H04M 1/66
382/115
(Continued)

FOREIGN PATENT DOCUMENTS

CN  104008319 A  *  8/2014  ............. G06F 21/32
CN  106774803 A  *  5/2017  ............... G06K 9/64
(Continued)

OTHER PUBLICATIONS

PCT International Search Report and Written Opinion dated Feb. 6, 2019 for International Application No. PCT/SE2018/051240, 13 pages.
(Continued)

*Primary Examiner* — Mohammed Rachedine
(74) *Attorney, Agent, or Firm* — RMCK Law Group, PLC (57) ABSTRACT The present invention relates to a method for controlling a device controller of an electronic device comprising a fingerprint sensor to transition from an at least partly active mode to an at least partly in-active mode. The fingerprint sensor itself is used for determining a presence of a finger on the fingerprint sensor, wherein a device controller is maintained in an at least partly active mode if a finger is detected on the fingerprint sensor. The present invention also relates to an electronic device comprising a fingerprint sensor and a device controller.

15 Claims, 8 Drawing Sheets (51) Int. Cl.
  *G06K 9/22*   (2006.01)
  *G06F 21/32*  (2013.01)

(56) References Cited

U.S. PATENT DOCUMENTS

| | | | |
|---|---|---|---|
| 2008/0041640 A1* | 2/2008 | Gillespie | G06F 3/04883 |
| | | | 178/18.01 |
| 2008/0061967 A1 | 3/2008 | Corrado | |
| 2015/0074615 A1* | 3/2015 | Han | H04L 63/083 |
| | | | 715/863 |
| 2015/0146945 A1 | 5/2015 | Han et al. | |
| 2016/0034742 A1 | 2/2016 | Kim et al. | |
| 2016/0180138 A1* | 6/2016 | Riedijk | G06K 9/0002 |
| | | | 324/686 |
| 2017/0131798 A1 | 5/2017 | Geaghan et al. | |
| 2017/0205870 A1 | 7/2017 | Desai et al. | |
| 2017/0220842 A1 | 8/2017 | Thompson et al. | |
| 2018/0032997 A1 | 2/2018 | Gordon et al. | |

FOREIGN PATENT DOCUMENTS

| | | | |
|---|---|---|---|
| KR | 20150111043 A | * | 10/2015 |
| WO | 2014124663 A1 | | 8/2014 |
| WO | 2017058081 A1 | | 4/2017 |

OTHER PUBLICATIONS

Extended European Search Report dated Jan. 15, 2021 for EP Application No. 18886824.4, 12 pages.

* cited by examiner

METHOD FOR TRANSITIONING A DEVICE CONTROLLER COMPRISED IN AN ELECTRONIC DEVICE, AND AN ELECTRONIC DEVICE

CROSS-REFERENCE TO RELATED APPLICATIONS

This application is a 371 U.S. National Stage of International Application No. PCT/SE2018/051240, filed Dec. 3, 2018, which claims priority to Swedish Patent Application No. 1751499-3, filed Dec. 6, 2017. The disclosures of each of the above applications are incorporated herein by reference in their entirety.

FIELD OF THE INVENTION

The present invention relates to a method for controlling a device controller of an electronic device comprising a fingerprint sensor to transition from an at least partly active mode to an at least partly in-active mode. The present invention further relates to an electronic device comprising a fingerprint sensor.

BACKGROUND OF THE INVENTION

Electronic equipment such as tablets, laptops, and mobile phones, commonly have a functionality which allows them to enter a low power mode (e.g. a sleep mode) after a certain predetermined time of user inactivity. From a power consumption point of view it is of course advantageous to allow the electronic equipment to enter a low power mode when the user appears to be non-active with the electronic equipment since it may extend the battery time of the equipment.

However, entering a sleep mode with the electronic equipment after some time of user inactivity may also be inconvenient in some cases and may cause user irritation. For example, a user who may be performing a time consuming activity such as reading on his/her mobile device which does not require direct user interaction with the mobile device. Such time consuming activity may not provide the user activity on the mobile device whereby it may therefore enter a sleep mode. This means that the user has to constantly wake up the mobile device.

WO2014/124663 describes an attempt to control the on-state and the off-state of a display comprised in a mobile electronic device based on the detection of a user's face from images acquired by a front facing camera of the mobile electronic device. If a user's face is detected and a movement sensor detects a movement of the mobile electronic device, the display is controlled to be in the on-state.

However, detection of a user's face requires activation of a camera which consumes a relatively high amount of power. Furthermore, in order for the camera to be able to detect the user's face, the user's face has to be in the field of view of the camera. In other words, if the user looks away, it may occur that the mobile electronic device incorrectly de-activates the display. Additionally, poor lighting conditions may also be problematic for detection of a user's face using a camera.

Accordingly, there appears to be room for improvement in controlling transitions between power states in electronic devices depending on user activity.

SUMMARY

In view of above-mentioned and other drawbacks of the prior art, it is an object of the present invention to provide an improved method to prevent at least some undesired transitions of an electronic device from an active mode to an in-active mode.

According to a first aspect of the present invention, there is provided a method for controlling a device controller of an electronic device comprising a fingerprint sensor to transition from an at least partly active mode to an at least partly in-active mode, the method comprising: when a first time limit is reached, determining whether a finger is present on the fingerprint sensor, the first time limit is below or equal to a time out limit for transitioning the device controller from the at least partly active mode to the at least partly in-active mode, such that the device controller is still in the at least partly active mode when the first time limit is reached; when a presence of the finger on the fingerprint sensor has been concluded, maintaining the device controller in the at least partly active mode at least until a second time limit is reached, wherein the following steps are repeated until it is determined that a finger is not present on the fingerprint sensor: when the second time limit is reached, determining whether the finger is still present on the fingerprint sensor, wherein, when the presence of the finger on the fingerprint sensor has been concluded, maintaining the device controller in the at least partly active mode at least until the second time limit is again reached, or, when it is determined that a finger is not present on the fingerprint sensor, transitioning the device controller from the at least partly active mode to the at least partly in-active mode.

The present invention is based upon the realization that a fingerprint sensor comprised in the electronic device can be used for probing the presence of the finger. In this way, the device controller may be maintained in the at least partly active mode as long as the finger is detected by the fingerprint sensor at intermediate times. Detection of a finger using a fingerprint sensor may be performed with low power consumption since the entire fingerprint sensor may not have to be activated for detecting the finger.

Detection of the finger using a fingerprint sensor may be performed in various ways known per se. For example, only a relatively small subset of pixels is sufficient for determining the presence of a finger on the fingerprint sensor. In some possible implementations, finger detecting structures of the fingerprint sensor external to the pixel array may be used for determining the presence of a finger on the fingerprint sensor. Using such finger detecting structures may reduce the power consumption even further.

Additionally, the invention provides the advantage that the user may direct the electronic device in any direction without risking the electronic device to enter an in-active mode. For example, the user may want to show the display of the electronic device to somebody else, or just want to look away from the electronic device for a while. With the inventive concept, the electronic device may still be maintained in an active mode, as long as the finger is detected on the fingerprint sensor.

A further advantage with the inventive concept, at least compared to some facial detection techniques is that the surrounding lighting conditions are irrelevant for the function of maintaining the electronic device in an active mode.

With the inventive concept, while the device controller is still in an at least partly active mode, it is checked using the fingerprint sensor that a finger is present on the fingerprint sensor. If it can be concluded that a finger is indeed present on the fingerprint sensor after a first limit which is reached before the device controller automatically enters the at least partly in-active mode (e.g. a sleep mode), a further time limit is set, referred to as a second time limit. When the second time limit is reached, it is again checked if the finger is present on the fingerprint sensor. If it can be concluded that the finger is still present on the fingerprint sensor, then the second time limit is again set. The device controller is maintained in the at least partly active mode until it is determined, that the finger is not present on the fingerprint sensor.

In order to keep track of when the time limits have been reached, the device controller or any other controller of the electronic device may use an internal clock of the electronic device.

The at least partly inactive mode may generally be a low power mode and the at least partly active mode is generally a normal operational mode for the device controller. Thus, a partly in-active mode may be generally known as a "low power mode" an "idle mode", or a "sleep mode" and a partly active mode may be known as a "normal power mode" relative to the "low power mode".

The device controller is comprised in the electronic device and provides functionality for the electronic device. The device controller may thus be considered as a "host controller" which is provided information from the fingerprint sensor, such as signals indicative of the presence of a finger on the fingerprint sensor, or sensing signals indicative of a fingerprint pattern.

A time limit is meant as duration of time counted by any suitable controller comprised in the electronic device. A time limit is reached when the a time duration corresponding to the time limit has passed starting from an initial starting point, either a common starting point for all time limits, or a subsequent time limit may be counted from the end of the previous time limit.

The first time limit may be on the order or seconds, e.g. 1, 2, 3, 4, 5, 6, 7, 8, 9, 10 seconds. The second time limit may also be on the order or seconds, e.g. 1, 2, 3, 4, 5, 6, 7, 8, 9, 10 seconds.

According to embodiments it may be included to, when it is determined that the finger is not present on the fingerprint sensor, maintaining the device controller in the at least partly active mode at least until a third time limit is reached, and when the third time limit is reached, determining whether the finger is again present on the fingerprint sensor, wherein when it is determined that a finger is not present on the fingerprint sensor, transitioning the device controller from the at least partly active mode to the at least partly in-active mode, or when it is determined that the finger is again present on the fingerprint sensor, returning to the repeated steps of maintaining the device controller in the at least partly active mode at least until the second time limit is reached. In this way, the device controller is not immediately transitioned to the at least partly in-active mode when the finger is determined to be not present on the fingerprint sensor. For example, a user may wish to temporarily move his/her finger away form the fingerprint second, and if this movement is close to the expiry of the second time limit, then the device controller may prematurely be transitioned to the at least partly in-active mode. With the implementation of the third time limit, the premature transition to the at least partly in-active mode may advantageously be prevented.

Accordingly, when the finger is determined to not be on the fingerprint sensor, i.e. when the fingerprint sensor does not detect the finger, the device controller is not immediately transitioned to the at least partly in-active mode. Instead, a time duration corresponding to third time limit is allowed to lapse, and then a new attempt to detect the finger on the fingerprint is performed. If the finger is then detected, the device controller is maintained in the at least partly active mode until the second time limit has passed and this is repeated as described above. However, if the finger is not detected when the third time limit is reached, then the device controller is transitioned to the at least partly in-active mode.

The third time limit may thus correspond to the time out limit for transitioning the device controller from the at least partly active mode to the at least partly in-active mode.

The third time limit may be on the order or seconds, e.g. 1, 2, 3, 4, 5, 6, 7, 8, 9, 10 seconds.

The second time limit may be equal to the first time limit, i.e. a single time limit is used which provides a relatively simple implementation. The time limits may in this case be adapted to be below the time limit for automatically transitioning the device controller to the at least partly in-active mode.

In further possible implementations of the inventive concept the second time limit may be longer than the first time limit. In this way, energy consumption may be reduced since the fingerprint sensor may thereby perform finger detection less frequently once it has been concluded when the first time limit has been reached that a finger is initially present.

According to one embodiment of the inventive concept, determining whether a finger is present on the fingerprint sensor when the first time limit is reached may comprise: probing the presence of the finger on the fingerprint sensor multiple times at a sampling rate, wherein when the finger is determined to be present each of or at least a majority of the multiple times of probing then the finger is concluded to be present on the fingerprint sensor.

Accordingly, the fingerprint sensor may ensure that the finger is maintained on the fingerprint sensor for a predetermined time by attempting to detect the finger multiple times during the predetermined time duration. The time duration may be on the order or seconds (e.g. 1 s, 2 s, 3 s, 4 s, 5 s, etc). If the finger is detected multiple times, then the second time limit may be used for timing of further finger detection. Further, If the finger is detected multiple times and the second time limit may be used, the device controller may be entered into a awake state in which detection of the finger when the second time limit has expired determines whether the device controller should be maintained in the at least partly awake mode or be transitioned to the at least partly in-active mode, and the time out limit normally used for automatically transitioning the device controller to the at least partially in-active mode may be ignored.

According to another embodiment, determining whether a finger is present on the fingerprint sensor when the second time limit is reached may comprise probing the presence of the finger a single time. Probing only a single time advantageously reduces the energy consumption compared to probing several times. Further, once the second time limit is used, it may already have been established that the finger has been present once when the first time it was reached. Thus, it may be assumed that the user desires to maintain the device controller in the at least partly active mode.

The electronic device may comprise a display unit, the method comprising: when the device controller is in the at least partly active mode controlling the display unit to be in a state with relatively high brightness, and, when the device controller is in the at least partly in-active mode controlling the display unit to be in a state with relatively low brightness.

Accordingly, it may be desirable to maintain the display unit of the electronic device in an "on-state" when the device controller is in the at least partly active mode. In this way, a user may continue using the display unit for e.g. reading without being interrupted by the display unit going dark, as long as the finger is detected by the fingerprint sensor when the time limits expire.

"Relatively high brightness" of the display unit may generally refer to an on-state of the display unit and a "relatively low brightness" may generally refer to an "off-state" of the display unit.

The time out limit for transitioning the device controller from the at least partly active mode to the at least partly in-active mode may refer to a time limit for display unit timeout.

According to embodiments of the inventive concept, when the presence of the finger has been confirmed after the first time limit is reached or after the second time limit is reached, acquiring a fingerprint image of the fingerprint of the finger present on the fingerprint sensor, determining a fingerprint representation based on the fingerprint image, matching the fingerprint representation with a set of stored fingerprint templates, wherein when it is determined that the fingerprint representation matches with at least one stored fingerprint template, updating the set of stored fingerprint templates with the fingerprint representation.

Thus, the set of templates used for fingerprint verification procedures may be updated in the background which may accelerate the process of creating a sufficiently large set of fingerprint enrollment templates. This will enhance the biometric performance of a fingerprint authentication procedure. The fingerprint representation entered into the set of stored fingerprint templates may thus be an enrollment representation.

In the context of the present application, the "enrolment representation" and/or the "verification representation" of a fingerprint image may be any information extracted from the fingerprint image, which is useful for assessing the similarity between fingerprint images acquired at different times. For instance, the enrolment/verification representation of the fingerprint image may comprise descriptions of fingerprint features (such as so-called minutiae) and information about the positional relationship between the fingerprint features. Alternatively, the representation of the fingerprint image may be the image itself, or a compressed version of the image. For example, the image may be binarized and/or skeletonized.

Various ways of extracting such verification representation or enrolment representation from a fingerprint image are well-known to a person of ordinary skill in the relevant art.

Updating the stored fingerprint templates may comprise adding the fingerprint representation to the set of fingerprint templates.

Alternatively, updating the stored fingerprint templates may comprise substituting one of the fingerprint templates in the set of stored fingerprint templates with the newly determined fingerprint representation.

According to a second aspect of the present invention there is provided an electronic device comprising: a fingerprint sensor configured to acquire fingerprint image data and to detect the presence of a finger; a device controller configure to operate in an at least partly active mode or an at least partly in-active mode; wherein the electronic device is arranged to: when a first time limit is reached, determine whether a finger is present on the fingerprint sensor the first time limit is below or equal to a time limit for transitioning the device controller from the at least partly active mode to the at least partly in-active mode, such that the device controller is still in the at least partly active mode when the first time limit is reached; when the presence of the finger on the fingerprint sensor has been concluded, maintain the device controller in the at least partly active mode at least until a second time limit is reached, wherein, when the device controller is in the at least partly active mode: each time the second time limit is reached, determine whether the finger is present on the fingerprint sensor, wherein when the presence of the finger on the fingerprint sensor has been concluded by the fingerprint sensor, maintain the device controller in the at least partly active mode at least until the second time limit is again reached, or when it is determined that a finger is not present on the fingerprint sensor, transition the device controller from the at least partly active mode to the at least partly in-active mode.

The electronic device may further be arranged to: when it is determined that the finger is not present on the fingerprint sensor, maintain the device controller in the at least partly active mode at least until a third time limit is reached, and when the third time limit is reached, determine whether the finger is again present on the fingerprint sensor, wherein when it is determined that a finger is not present on the fingerprint sensor, transition the device controller from the at least partly active mode to the at least partly in-active mode, or when it is determined that the finger is again present on the fingerprint sensor, returning to maintaining the device controller in the at least partly active mode each time the second time limit is reached.

The electronic device may comprise a display unit configured to be in a state with relatively high brightness when the device controller is in the at least partly active mode, and to be in a state with relatively low brightness when the device controller is in the at least partly in-active mode.

The electronic device may be a portable electronic device and the fingerprint sensor may be side mounted on the portable electronic device.

The electronic device may be a portable electronic device and the fingerprint sensor may be back mounted on the portable electronic device.

The electronic device may be a mobile device (e.g. a mobile phone), a tablet, or a laptop, or a desktop computer or any other present or future suitable electronic device comprising a fingerprint sensor.

The fingerprint sensor may be a capacitive fingerprint sensor. Such a capacitive fingerprint sensor may comprise capacitive sensing elements, each providing a measure indicative of the capacitive coupling between that particular sensing element and a finger surface touching the sensor surface. Sensing elements at locations corresponding to ridges in the fingerprint will exhibit a stronger capacitive coupling to the finger than sensing elements at locations corresponding to valleys in the fingerprint.

However, the various embodiments of the present invention are not limited to a fingerprint sensing device comprising sensing elements utilizing a particular fingerprint sensing technology, but are equally applicable to, for instance, optical, thermal, capacitive, acoustic/ultra-sound, or piezo-electric fingerprint sensors etc.

The fingerprint sensor device may comprise additional circuitry for operating on sensing signals indicative of the fingerprint pattern provided by the sensing elements. Such additional circuitry, may for instance include sampling circuitry and analog-to-digital conversion circuitry. Thus, the fingerprint sensor may thus provide a fingerprint pattern signal as a digital signal. Alternatively, the fingerprint pattern signal may be provided as an analog signal. For example, the signals may be analog or digital values indicative of a voltage, which may in turn be proportional to the capacitance of the capacitor constituted by the finger (or other conductive object in the vicinity of the finger detecting structure), the finger detecting structure and the dielectric material there between.

Further embodiments of, and effects obtained through this second aspect of the present invention are largely analogous to those described above for the first aspect of the invention.

In summary, the present invention relates to a method for controlling a device controller of an electronic device comprising a fingerprint sensor to transition from an at least partly active mode to an at least partly in-active mode. The fingerprint sensor itself is used for determining a presence of a finger on the fingerprint sensor, wherein the device controller is maintained in an at least partly active mode if a finger is detected on the fingerprint sensor. The present invention also relates to an electronic device comprising a fingerprint sensor and a device controller.

Further features of, and advantages with, the present invention will become apparent when studying the appended claims and the following description. The skilled addressee realizes that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the fingerprint sensing system and method according to the present invention are mainly described with reference to a mobile device having an integrated fingerprint sensing device. However, it should be noted that the inventive concept may be applicable to many other kinds of electronic devices may having such a fingerprint sensing device integrated, such as tablets, or laptops, etc.

Figures 1A, 1B:
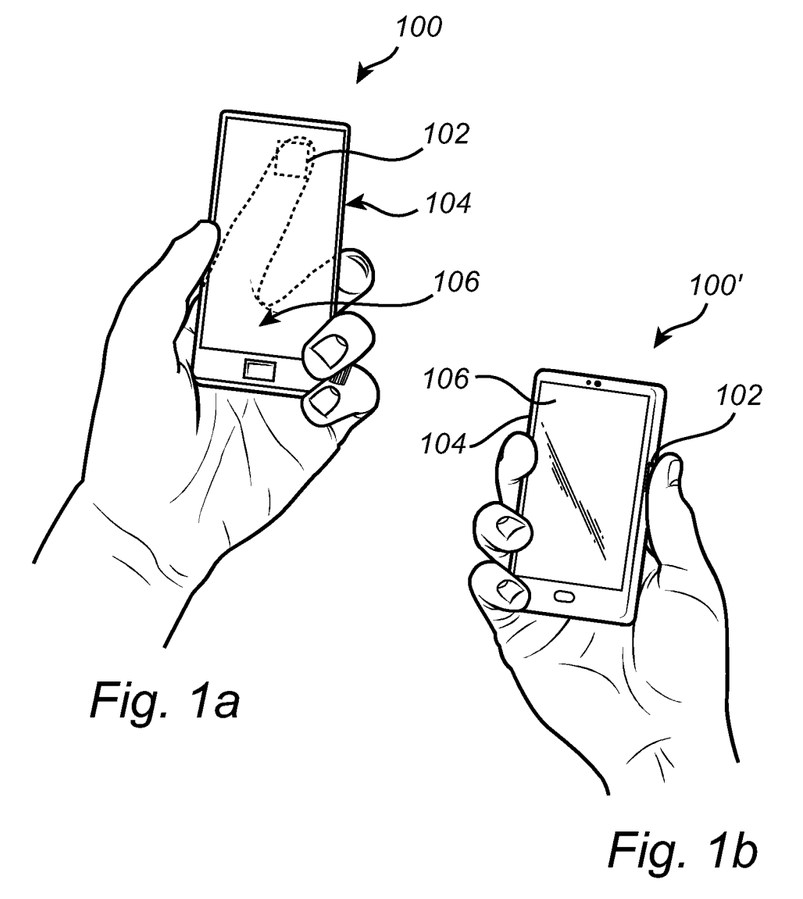
FIG. 1a schematically illustrates an electronic device according to an example embodiment of the present invention.
FIG. 1b schematically illustrates an electronic device according to an example embodiment of the present invention.

Turning now to the drawings and to FIG. 1a in particular, there is schematically illustrated an example of an electronic device configured to apply the concept according to the present disclosure, in the form of a mobile device 100 with an integrated fingerprint sensor 102 and a display unit 104 with a touch screen interface 106. In this embodiment the fingerprint sensor 102 is arranged on a back side of the mobile device 100, opposite the display unit 104 which is positioned on a front side of the mobile device 100. The fingerprint sensor 102 may, for example, be used for unlocking the mobile device 100 and/or for authorizing transactions carried out using the mobile device 100, etc. The mobile device 100 may further comprise a device controller (not shown) configured to control functions of the mobile device, such as for example the brightness level of the display unit 104, or switching between an on-state and an off-state for the display unit 104.

FIG. 1b schematically illustrates another example of an electronic device configured to apply the concept according to the present disclosure, in the form of a mobile device 100'. Similar to the example electronic device schematically illustrated in FIG. 1a, the mobile device 100' comprises an integrated fingerprint sensor 102 and a display unit 104 with a touch screen interface 106. The display unit 104 is positioned on a front side of the mobile device 100'. In this embodiment the fingerprint sensor 102 is arranged on a side (i.e. "side mounted") of the mobile device 100'.

Preferably and as is apparent for the skilled person, the mobile devices 100 and 100' shown in FIG. 1a-b further may comprise a first antenna for WLAN/Wi-Fi communication, a second antenna for telecommunication communication, a microphone, a speaker, and a phone control unit. Further hardware elements are of course possibly comprised with the mobile device.

It should furthermore be noted that the invention may be applicable in relation to several types of electronic devices, preferably portable electronic device, such as laptops, tablet computers, mobile phones, etc.

In regards to all of the electronic devices such as the ones shown in FIGS. 1a-b, the fingerprint sensor 102 is arranged in electrical or wireless communication with a control unit adapted for controlling the fingerprint sensor 102.

Accordingly, the fingerprint sensor 102 may be comprised in a fingerprint sensing system comprising a control unit (not shown). The control unit may be part of a stand-alone fingerprint sensing system, or the control unit may be a control unit of the host electronic device, i.e. a device controller. Such a device controller may further be configured to provide an authentication request for a finger to the fingerprint sensing device 102. Such an authentication request may for example relate to requesting access to i.e. the electronic device or any other device employing a fingerprint sensor, or to authorize a transaction, etc. The control unit may subsequently receive the authentication signal from the fingerprint sensor device 102. If the authentication signal indicates authentication success at least one action may be performed.

Figure 2:
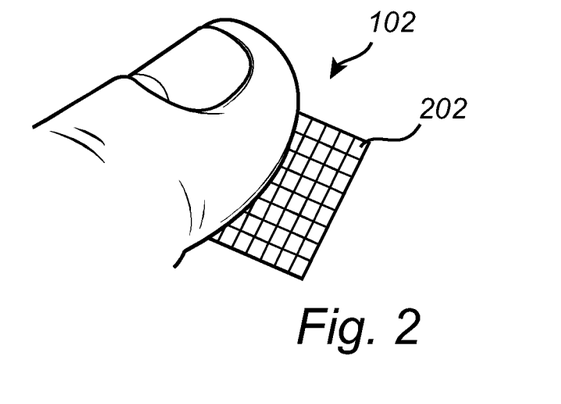
FIG. 2 schematically shows the fingerprint sensing device in FIGS. 1 a-b.

With reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the invention, including two-dimensional array with less pixels as compared to the above example. A single sensing element (also denoted as a pixel) is in FIG. 2 indicated by reference numeral 202.

Figure 3A:
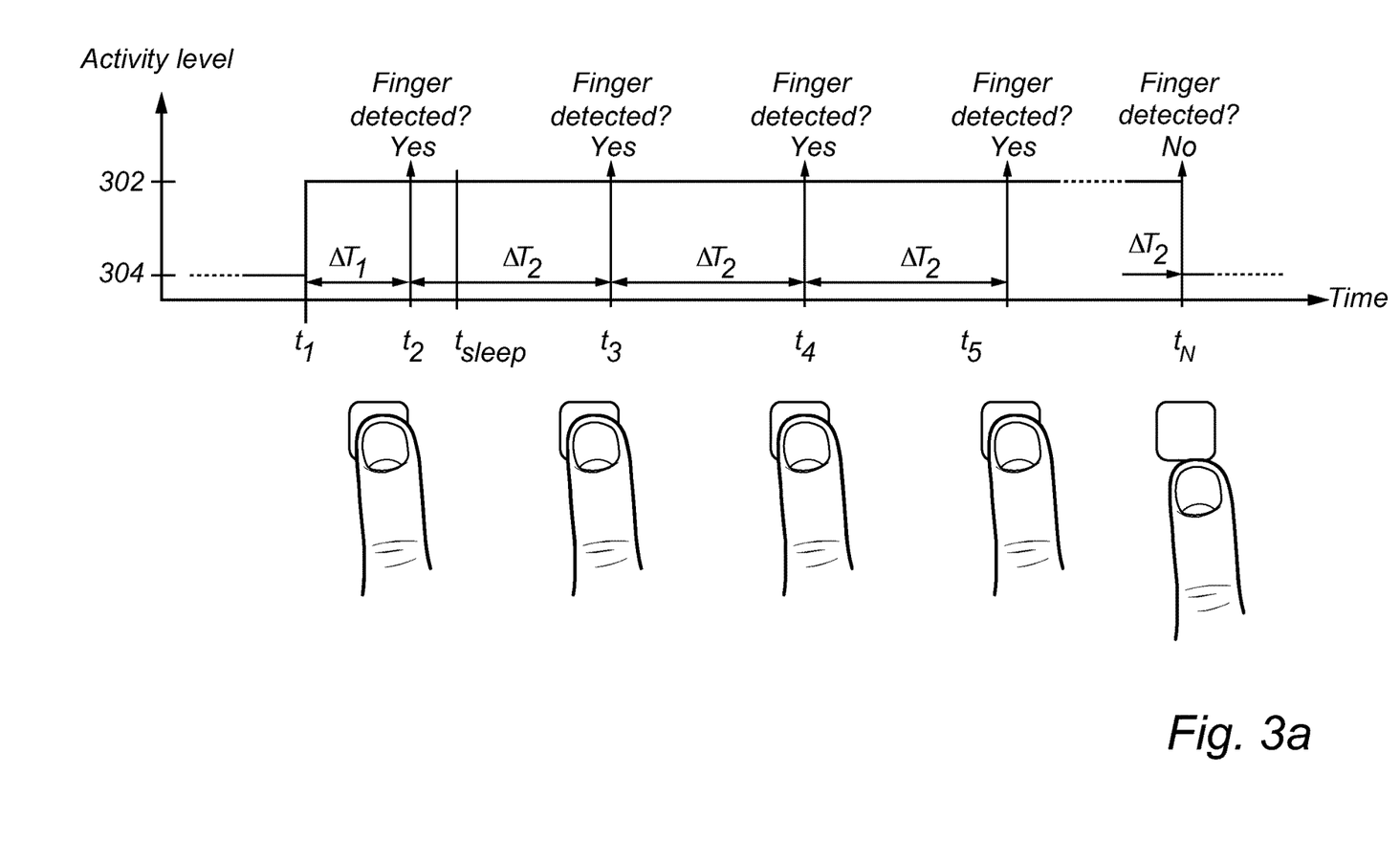
FIG. 3a-c each conceptually illustrates embodiments of the invention.

FIG. 3a conceptually illustrates a methodology according to embodiments of the present disclosure. FIG. 3 shows a time diagram with the activity level of a device controller on one axis and the time on the other axis. On the activity level axis there is indicated an at least partly active level 302 corresponding to an at least partly active mode of the device controller and an at least partly in-active level 304 corresponding to an at least partly in-active mode of the device controller.

In the timing diagram shown in FIG. 3a it is assumed that the device controller is in its at least partly in-active mode 304 until time $t_1$ when e.g. user input causes the device controller to transition to the at least partly active mode 302. The device controller has a predetermined time out at which the device controller is transitioned back to the at least partly in-active mode 304. The expiry of the time out limit for transitioning the device controller from the at least partly active mode to the at least partly in-active mode is indicated by $t_{sleep}$, thus the time duration from $t_1$ to $t_{sleep}$, defines this time out limit.

A first time limit ΔT1 is indicated in FIG. 3a and is given by the time duration from $t_1$ to $t_2$ and is shorter than the time out limit for transitioning the device controller from the at least partly active mode to the at least partly in-active mode indicated by $t_{sleep}$. If a finger is detected by a fingerprint sensor comprised in the same electronic device as the device controller when the first time limit ΔT1 is reached at time $t_2$ then the device controller is maintained in the at least partly active mode 302 at least until a second time limit ΔT2 is reached, here the second time limit ΔT2 is reached at time $t_3$. The time out limit that expires at $t_{sleep}$ is then ignored.

When the second time limit ΔT2 is reached at time $t_3$ it is determined, using the fingerprint sensor, whether the finger is still present on the fingerprint sensor. If the finger can be concluded to be present on the fingerprint sensor when the second time limit ΔT2 is reached at time $t_3$, the second time limit ΔT2 is again set and is next reached at time $t_4$. The device controller is again maintained in the at least partly active mode 302 at least until the second time limit ΔT2 is again reached, now at time $t_4$. The above procedure is continued by initiating the use of the second time limit and maintaining the device controller in the at least partly active mode as long as the finger is detected at the expiry of the second time limit ΔT2 every time it is reached.

At some point, when a second time limit has been reached, the finger may be determined to be not present on the fingerprint sensor, as is indicated at time $t_N$ in FIG. 3a. In such case, the device controller is transitioned from the at least partly active mode 302 to the at least partly in-active mode 304.

In the example timing diagram of FIG. 3a the second time limit ΔT2 is shown to be longer than the first time limit ΔT1. However, the second time limit ΔT2 may in other possible implementations be shorter than the first time limit ΔT1 or equal to the first time limit ΔT1.

Figure 3B:
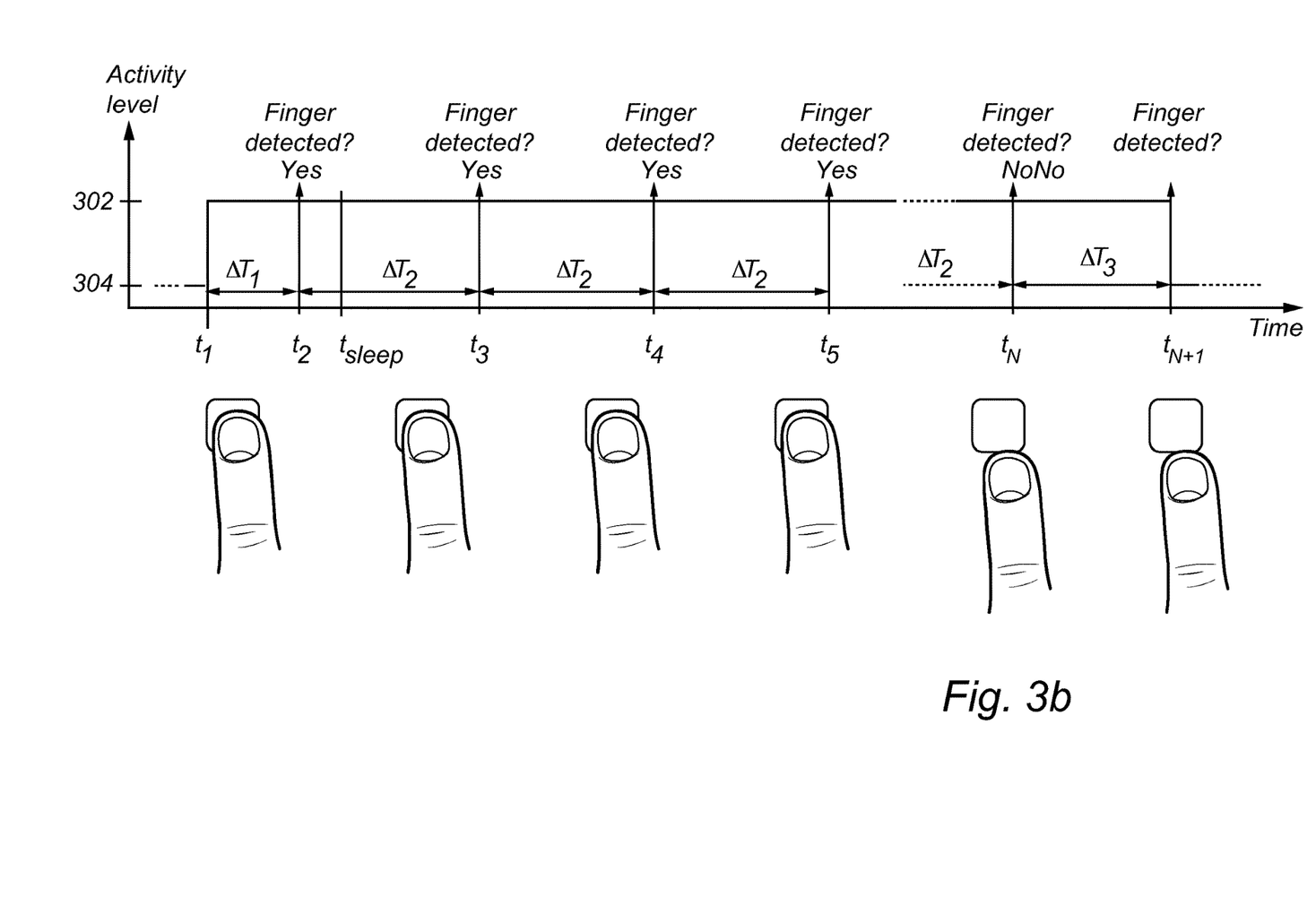
Figure 3C:
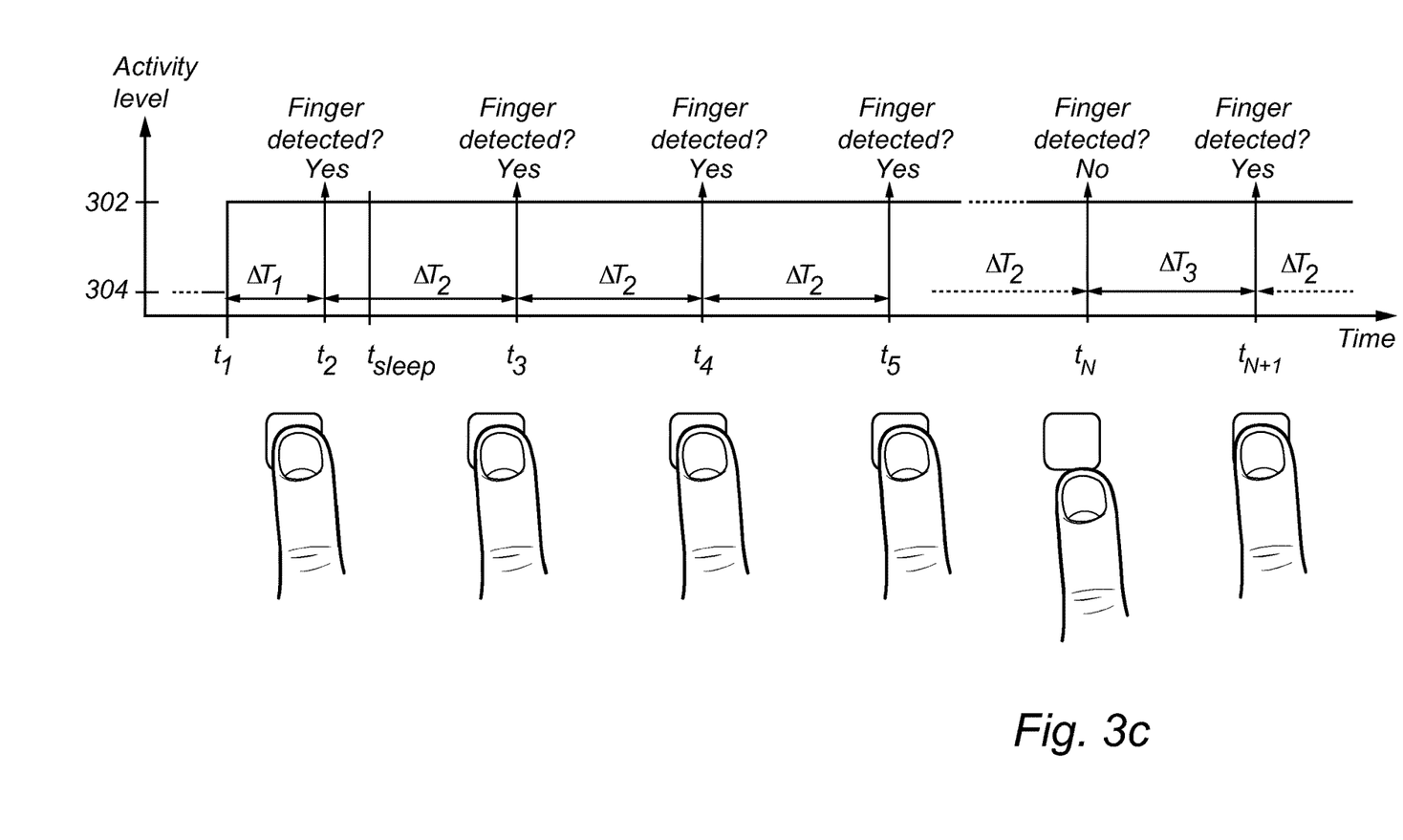

FIG. 3b-c each illustrates a further timing diagram which differs from the timing diagram in FIG. 3a only after the finger is not detected at time $t_N$. In the embodiment described with reference to FIG. 3b, the device controller is maintained in the at least partly active mode at least until a third time limit (ΔT3) is reached at time $t_{N+1}$ when the finger is not detected. When the third time limit is reached at time $t_{N+1}$ it is again checked whether the finger can be detected by the fingerprint sensor.

As shown in FIG. 3b, when it is determined that the finger is not present on the fingerprint sensor, the device controller is transitioned from the at least partly active mode to the at least partly in-active mode at time $t_{N+1}$.

However, as shown in FIG. 3c, when it is determined that the finger is again present on the fingerprint sensor, then the device controller is maintained in the at least partly active mode at least until the second time limit is reached, and the method returns to using the second time limit as described above with reference to FIG. 3a. With the described embodiment in FIGS. 3b-c the user is allowed to temporarily remove his/her finger from the fingerprint sensor without risking premature transition of the device controller to the at least partly in-active mode.

To determine that a finger is detected may be performed according to various protocols, for example using a single detection sample (i.e. a single probing), or using several detection samples (multiple probing).

Figure 4:
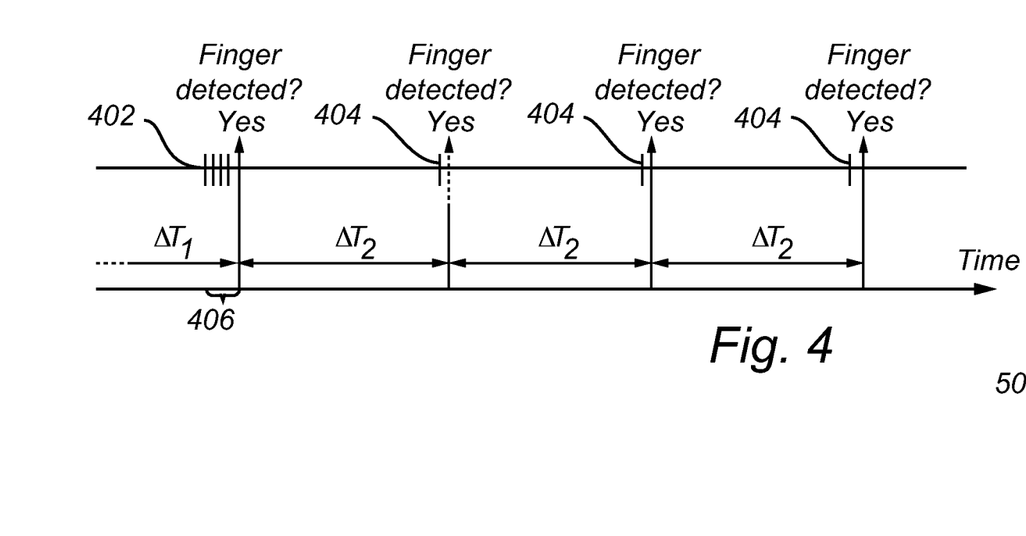
FIG. 4 conceptually illustrates embodiments of the invention.

FIG. 4 illustrates one possible way of determining the presence of a finger on the fingerprint sensor. When the first time limit ΔT1 is reached it is determined that a finger is present by probing the presence of the finger multiple times as indicated by the lines 402. In other words, the fingerprint sensor attempts to detect the finger several times (e.g. 5-10 times), and only if the finger is detected each of the several times indicated by lines 402, or at least a majority of the several probing times, it is concluded that a finger is present when the first time limit ΔT1 is reached.

Furthermore, when the second time limit ΔT2 is reached is it determined that a finger is present by probing the presence of the finger a single time 404. In this way, it first determined that the finger is maintained on the fingerprint sensor for a predetermined time period 406 during which the fingerprint sensor detects the finger several times. It can then be assumed that the user intends to keep his/her finger on the fingerprint sensor and thus maintain the device controller in the at least partly active mode 302. In order to reduce energy consumption, the fingerprint sensor subsequently probes only a single time 404 to determine that a finger is present or not when the second time limit ΔT2 is reached.

It should be understood that the sampling frequency and the number of samples may differ from what is illustrated in the conceptual drawing FIG. 4. Further the timing of the probing and the actual determining of the presence of a finger may be performed with arbitrary delay between each other, but preferably the determining of the presence is performed immediately after the probing.

Figure 5:
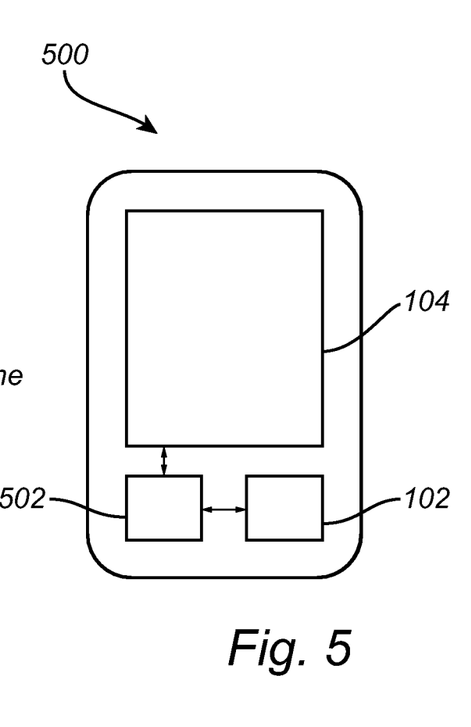
FIG. 5 illustrates a block diagram of an electronic device.

FIG. 5 illustrates an electronic device 500 as a block diagram. The electronic device comprises a fingerprint sensor 102 comprising means for detecting the presence of a finger. A device controller 502 is connected to the fingerprint sensor for receiving signals indicative of the presence of a finger on the fingerprint sensor. As described with reference to the above drawings, if a finger is detected by the fingerprint sensor 102 then the device controller 502 may be maintained in an at least partly active mode. Further, the device controller 502 is configured to control the brightness state of a display unit 104. For example, when the device controller 502 is in the at least partly active mode it may control the display unit 104 to be in a state with relatively high brightness. Further, when the device controller 502 is in the at least partly in-active mode it may control the display unit 104 to be in a state with relatively low brightness.

Figure 6:
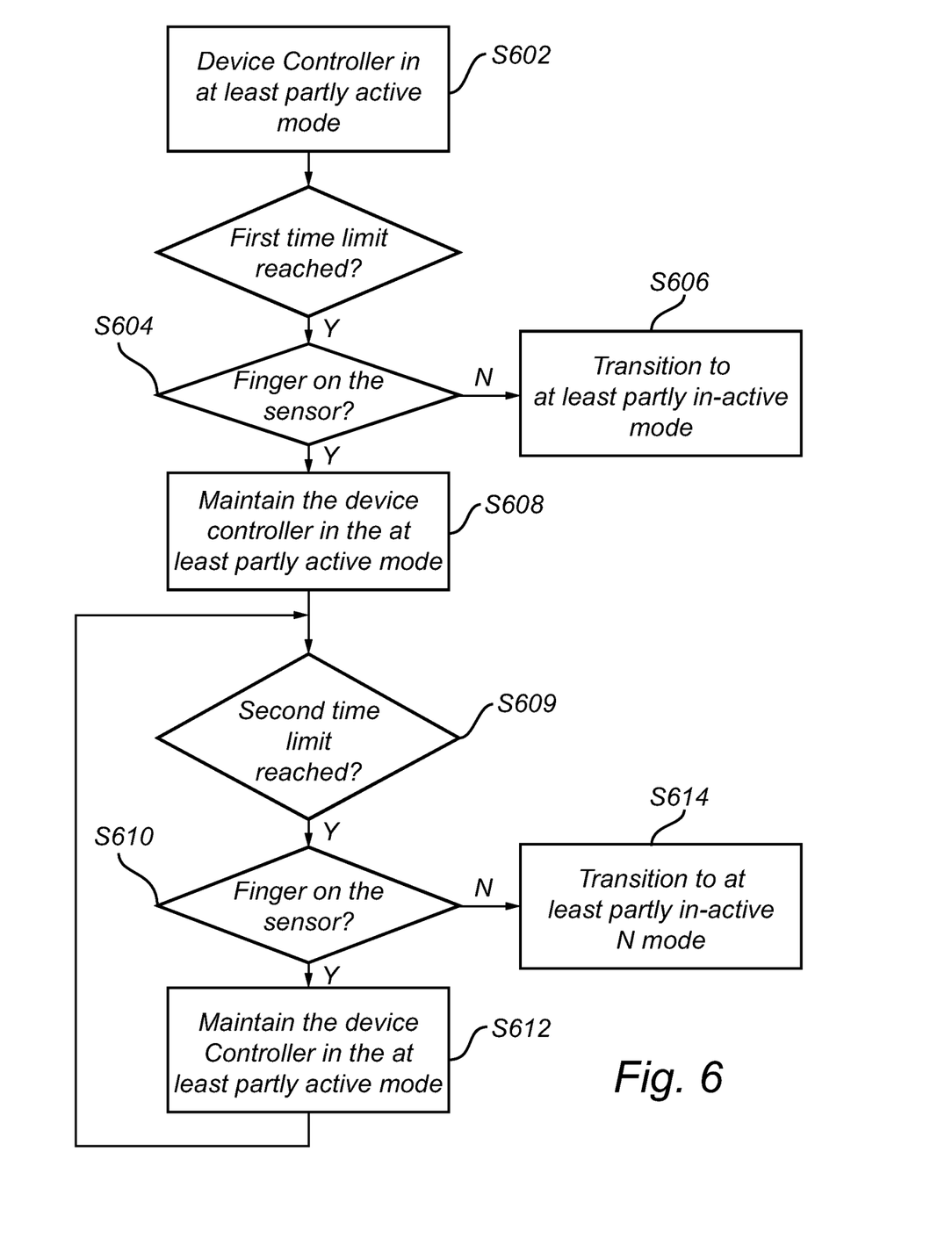
FIG. 6 is a flow-chart schematically illustrating a method according to an embodiment of the present invention.

FIG. 6 is a flow-chart of method steps in accordance with embodiments of the present disclosure. As indicated by step S602, it is firstly confirmed that the device controller is in an at least partly active state. When a first time limit is reached, it is determined in step S604 whether a finger is present on the fingerprint sensor. The first time limit is below or equal to a time out limit for transitioning the device controller from the at least partly active mode to the at least partly in-active mode, such that the device controller is still in the at least partly active mode when the first time limit is reached. If the finger is not detected by the fingerprint sensor, then the device controller may transition (S606) to the at least partly in-active mode, either directly in case the first time limit is equal to a timeout time limit for the device controller, or after that the timeout time limit has been reached.

If the finger is detected in step S604, then the device controller is maintained (S608) in the at least partly active mode at least until a second time limit is reached.

When the second time limit is reached (S609), it is again determined in step S610 whether the finger is present on the fingerprint sensor. When the presence of the finger on the fingerprint sensor has been concluded, then, in step S612 the device controller is again maintained in the at least partly active mode at least until the second time limit is again reached, and the method starts over in step S609.

However, when it is determined that a finger is not present on the fingerprint sensor in step S610, then the device controller is transitioned S614 from the at least partly active mode to the at least partly in-active mode.

Figure 7:
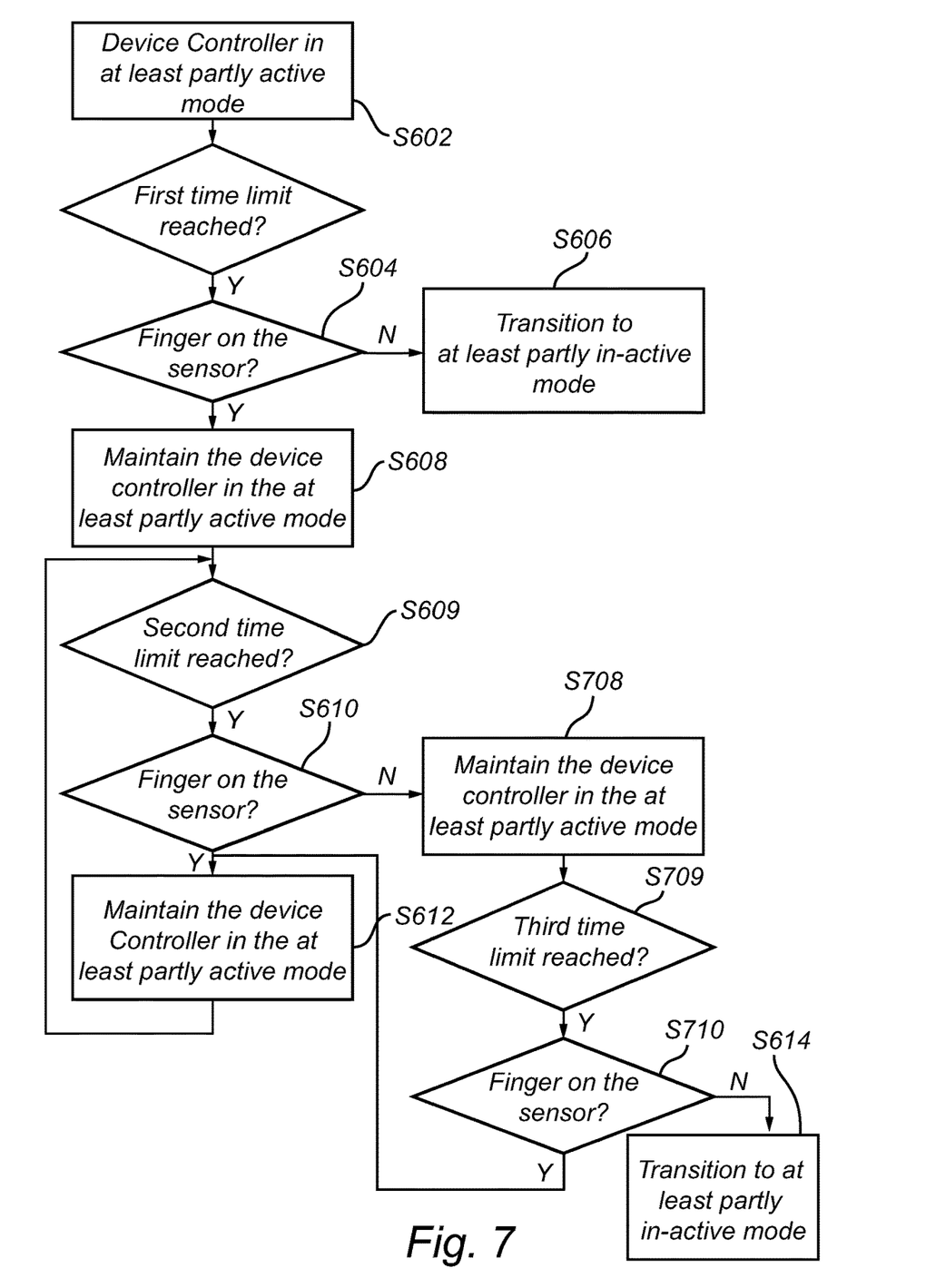
FIG. 7 is a flow-chart schematically illustrating a method according to an embodiment of the present invention.

FIG. 7 is a flow chart with method steps according to further embodiments of the present disclosure. The flowchart in FIG. 7 includes steps which are described with reference with FIG. 6 and share reference numerals and will not be repeated here. In addition to the method steps in FIG. 6, the embodiment described in FIG. 7 includes to maintain S708 the device controller in the at least partly active mode at least until a third time limit is reached when it is determined in step S610 that a finger was not on the fingerprint sensor. When the third time limit has been reached (S709), it is again determined in step S710 whether the finger is present on the fingerprint sensor. If it is determined in step S710 that a finger is not present on the fingerprint sensor, the device controller is transitioned from the at least partly active mode to the at least partly in-active mode in step S614. However, if it is determined that the finger is present on the fingerprint sensor in step S710, then the method returns to step S612 and again repeats the maintaining of the device controller in the at least partly active mode at least until the second time limit is reached.

Figure 8:
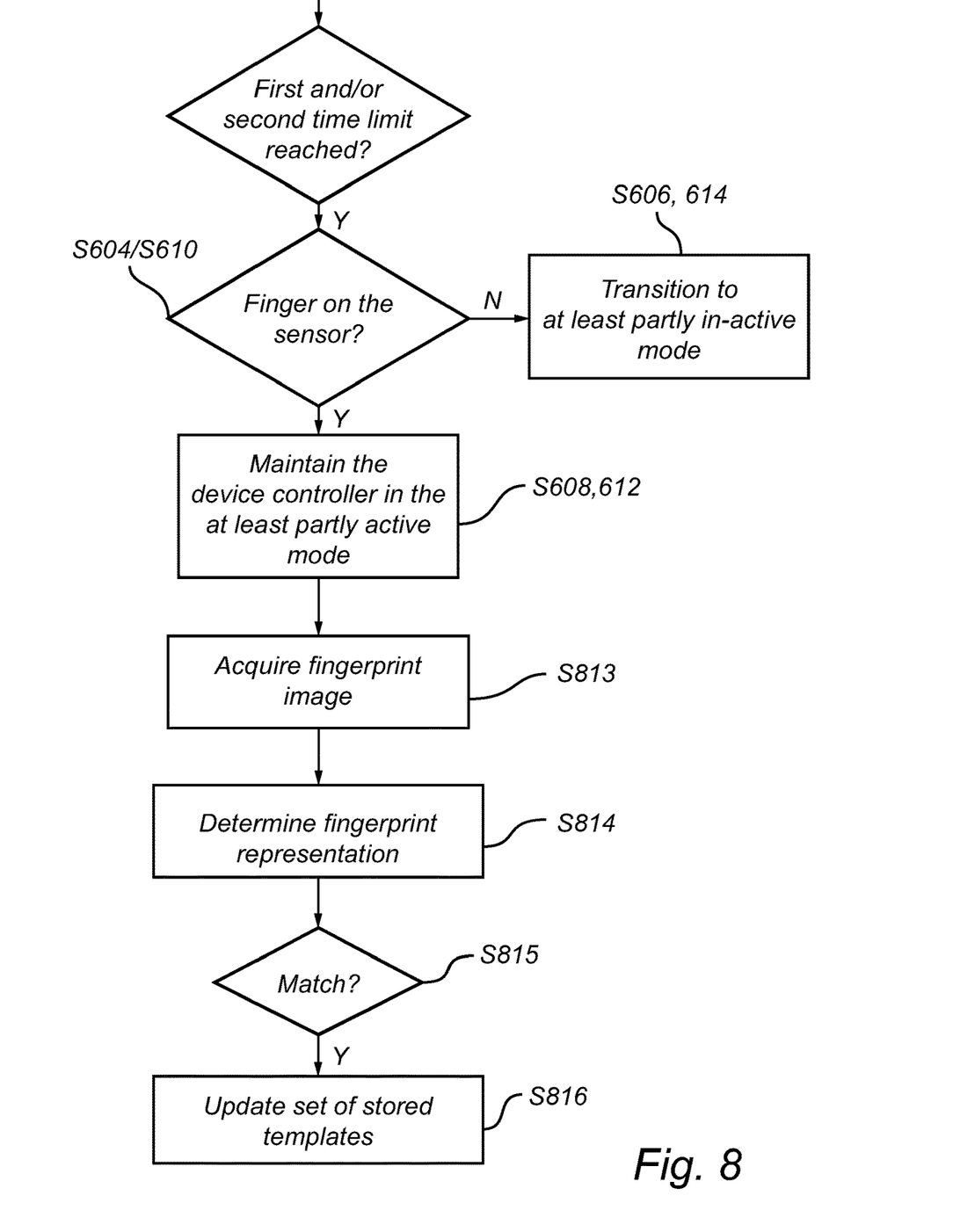
FIG. 8 is a flow-chart schematically illustrating a method according to an embodiment of the present invention.

FIG. 8 is a flow-chart of method steps according to further embodiments of the present disclosure. Firstly, when the presence of the finger has been confirmed in when any one of the first time limit is reached or the second time limit is reached in the steps S604 or S610 from FIG. 6 or FIG. 7, the device controller is maintained in an at least partly active mode (steps S608 and S612 from FIG. 6 and FIG. 7). When it was confirmed that a finger was present on the fingerprint sensor, the fingerprint sensor subsequently in step S813 acquires a fingerprint image of the fingerprint of the finger touching the fingerprint sensor. Based on the fingerprint image a fingerprint representation is determined in step S814. The fingerprint representation is matched with a set of stored fingerprint templates (S815). When it is determined that the fingerprint representation matches with at least one stored fingerprint template, the set of stored fingerprint templates is updated with the fingerprint representation in step S816.

The updating of the set of stored fingerprint templates may be performed by either adding the newly determined fingerprint representation to the set of stored fingerprint templates if there is storage space available for further templates, or the newly determined fingerprint representation may substitute a previous template in the set of fingerprint templates. Which template to substitute may be determined by for example selecting the template that has the lowest usage frequency, i.e. the template that is the least frequently using for fingerprint matching, and replace that template with the newly determined fingerprint representation.

Determining the presence of a finger on a fingerprint sensor may be performed in various ways. For example, a subset of sensing elements (i.e. "pixels") of the fingerprint sensor may be used for detecting the finger. In case a capacitive fingerprint sensor is used it may comprise capacitive sensing elements, each providing a measure indicative of the capacitive coupling between that particular sensing element and a finger surface touching the sensor surface. The capacitive coupling may then be used as a measure to detect the presence of a finger.

A further possibility for determining the presence of the finger is to use capacitive finger detecting structures arranged next to the array of sensing elements (i.e. array of pixels). Such capacitive finger detecting structures would provide a measure indicative of the capacitive coupling between that particular finger detecting structure and a finger surface touching the finger detecting structure. In this way, the pixel array would not be needed for finger detection. Such finger detection is disclosed in WO2017/058081 incorporated herein by reference.

It should be understood that various other methods for determining the presence of the finger on the fingerprint sensor is possible and within the scope of the present disclosure.

The device controller (or any other control unit of the present disclosure) may include a microprocessor, microcontroller, programmable digital signal processor or another programmable device. The device controller may also, or instead, each include an application specific integrated circuit, a programmable gate array or programmable array logic, a programmable logic device, or a digital signal processor. Where the device controller includes a programmable device such as the microprocessor, microcontroller or programmable digital signal processor mentioned above, the processor may further include computer executable code that controls operation of the programmable device.

The functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for controlling a device controller of an electronic device comprising a fingerprint sensor to transition from a normal power mode to a low power mode relative the normal power mode, the method comprising:
   when a first time limit is reached, determining whether a finger is present on the fingerprint sensor, the first time limit is below or equal to a time out limit for transitioning the device controller from the normal power mode to the low power mode, such that the device controller is still in the normal power mode when the first time limit is reached;
   when a presence of the finger on the fingerprint sensor has been concluded, maintaining the device controller in the normal power mode at least until a second time limit is reached,
   wherein the following steps are repeated until it is determined that a finger is not present on the fingerprint sensor:
   (I) when the second time limit is reached, determining whether the finger is still present on the fingerprint sensor, wherein
      (a) when the presence of the finger on the fingerprint sensor has been concluded, maintaining the device controller in the normal power mode at least until the second time limit is again reached, or,
      (b) when it is determined that a finger is not present on the fingerprint sensor, maintaining the device controller in the normal power mode at least until a third time limit is reached, and
   (II) when the third time limit is reached, determining whether the finger is again present on the fingerprint sensor, wherein
      (a) when it is determined that a finger is not present on the fingerprint sensor, transitioning the device controller from the normal power mode to the low power mode, or
      (b) when it is determined that the finger is again present on the fingerprint sensor, returning to the repeated steps of maintaining the device controller in the normal power mode at least until the second time limit is reached.

2. The method according to claim 1, wherein the second time limit is equal to the first time limit.

3. The method according to claim 1, wherein the second time limit is longer than the first time limit.

4. The method according to claim 1, wherein determining whether a finger is present on the fingerprint sensor when the first time limit is reached comprises:
   probing the presence of the finger on the fingerprint sensor multiple times at a sampling rate, wherein when the finger is determined to be present each of or at least a majority of the multiple times of probing then the finger is concluded to be present on the fingerprint sensor.

5. The method according to claim 1, wherein determining whether a finger is present on the fingerprint sensor when the second time limit is reached comprises probing the presence of the finger a single time.

6. The method according to claim 1, wherein the electronic device comprises a display unit, the method comprising:
   when the device controller is in the normal power mode controlling the display unit to be in a state with a high brightness level, and,
   when the device controller is in the low power mode controlling the display unit to be in a state with a low brightness level in relation to the high brightness level.

7. The method according to claim 1, comprising:
   when the presence of the finger has been confirmed after the first time limit is reached or after the second time limit is reached,
   acquiring a fingerprint image of the fingerprint of the finger present on the fingerprint sensor,
   determining a fingerprint representation based on the fingerprint image,
   matching the fingerprint representation with a set of stored fingerprint templates, wherein
   when it is determined that the fingerprint representation matches with at least one stored fingerprint template,
   updating the set of stored fingerprint templates with the fingerprint representation.

8. The method according to claim 7, wherein updating the stored fingerprint templates comprises:
   adding the fingerprint representation to the set of fingerprint templates.

9. The method according to claim 7, wherein updating the stored fingerprint templates comprises:
   substituting one of the fingerprint templates in the set of stored fingerprint templates with the fingerprint representation.

10. An electronic device comprising:
    a fingerprint sensor configured to acquire fingerprint image data and to detect the presence of a finger;
    a device controller configured to operate in a normal power mode or a low power mode relative the normal power mode;
    wherein the electronic device is arranged to:
      when a first time limit is reached, determine whether a finger is present on the fingerprint sensor, the first time limit is below or equal to a time limit for transitioning the device controller from the normal power mode to the low power mode, such that the device controller is still in the normal power mode when the first time limit is reached;
      when the presence of the finger on the fingerprint sensor has been concluded, maintain the device controller in the normal power mode at least until a second time limit is reached, wherein, when the device controller is in the normal power mode:
         (I) each time the second time limit is reached, determine whether the finger is present on the fingerprint sensor, wherein (a) when the presence of the finger on the fingerprint sensor has been concluded by the fingerprint sensor, maintain the device controller in the normal power mode at least until the second time limit is again reached, or
(b) when it is determined that a finger is not present on the fingerprint sensor, maintain the device controller in the normal power mode at least until a third time limit is reached, and (II) when the third time limit is reached, determine whether the finger is again present on the fingerprint sensor, wherein
(a) when it is determined that a finger is not present on the fingerprint sensor, transition the device controller from the normal power mode to the low power mode, or
(b) when it is determined that the finger is again present on the fingerprint sensor, returning to maintaining the device controller in the normal power mode each time the second time limit is reached.

11. The electronic device according to claim 10, comprising a display unit configured to be in a state with high brightness level when the device controller is in the normal mode, and to be in a state with a low brightness level relative the high brightness level when the device controller is in the low power mode.

12. The electronic device according to claim 10, wherein the electronic device is a portable electronic device and the fingerprint sensor is side mounted on the portable electronic device.

13. The electronic device according to claim 10, wherein the electronic device is a portable electronic device and the fingerprint sensor is back mounted on the portable electronic device.

14. The electronic device according to claim 10, wherein the electronic device is a mobile phone.

15. The electronic device according to claim 10, wherein the fingerprint sensor is a capacitive fingerprint sensor.

* * * * *